United States Patent [19]

Amar

[11] Patent Number: 5,783,764
[45] Date of Patent: Jul. 21, 1998

[54] PIANOPICS DISPLAY AND ASSOCIATED MUSICAL NOTATION

[76] Inventor: Jean-Claude Amar, 109 Lincoln St., Montclair, N.J. 07042

Related U.S. Application Data

[60] Provisional application No. 60/018,919 Jun. 4, 1996.

[21] Appl. No.: 866,893

[22] Filed: May 30, 1997

[51] Int. Cl.⁶ .................................................. G09B 15/08
[52] U.S. Cl. ........................ 84/479 A; 84/464 R; 84/483
[58] Field of Search ............................ 84/477 R, 478, 84/479 R, 479 A, 483.2, 464 A

[56] References Cited

U.S. PATENT DOCUMENTS

| | | | |
|---|---|---|---|
| 1,473,495 | 11/1923 | Miller | 84/483.2 |
| 2,157,168 | 5/1939 | Fine | 84/481 |
| 3,698,277 | 10/1972 | Barra | 84/483.2 X |
| 3,700,785 | 10/1972 | Leonard | 84/470 R |
| 4,361,070 | 11/1982 | Huiner | 84/478 |
| 4,366,741 | 1/1983 | Titus | 84/478 |
| 4,885,969 | 12/1989 | Chesters | 84/478 X |
| 5,574,238 | 11/1996 | Mencher | 84/483.2 |

*Primary Examiner*—John W. Cabeca
*Assistant Examiner*—Jeffrey W. Donels
*Attorney, Agent, or Firm*—Gerald E. Hespos

[57] ABSTRACT

A musical keyboard instruction device composed of a pianopics display device and its associated keyboard musical notation, which convey readily the information needed to play the piano and any like keyboard instrument. It does so by using a partial keyboard picture-like diagram to identify the spatial location of the keys to be pressed and the metaphor of a bouncing ball over duration numerals as a timing diagram to indicate the length of the tones and their order of play.

9 Claims, 12 Drawing Sheets

Middle "C"

FIG. 1

Middle "C"

Twinkle, twinkle, little star,
How I wonder what you are,
Up above the world so high,
Like a diamond in the sky!
Twinkle, twinkle, little star,
How I wonder what you are!

PIANOPICS DISPLAY AND ASSOCIATED MUSICAL NOTATION

BACKGROUND OF THE INVENTION

This application claims the benefit of U.S. Provisional Application No. 60/018,919, filed Jun. 4, 1996.

1. Field of the Invention

The present invention relates to a musical keyboard instruction device, its associated musical notation, and a printed ruler to be used by piano teachers and students in order to convey and acquire literacy for the music of keyboard instruments.

2. Description of the Prior Art

Standard music notation includes the familiar five-line staff and notes and is used to play basically all instruments. A consequence of this universality is that it makes it necessary for an aspiring piano player to first mentally determine the note name by its notational symbol and second physically find the note on the keyboard. To further complicate the matter, the same note appears on different locations of different staves. In addition the key signatures alters the relationship between the note seen and the key pressed.

A number of keyboard instruction devices have been devised to help learn the standard musical notation system. A great many number of altogether different music notation systems associated or not with a device have been designed, some successfully like the tablatures for guitar play, but most remained unused.

A dedicated keyboard instruction display and associated music notation that create mental pictures directly usable in order to play the piano and memorize pieces has not yet been devised. Therefore an object of this invention is to provide this and introduce the notion of musical "words" referenced here as pianopics.

SUMMARY OF THE INVENTION

The invention relates to a piano teaching method, a musical keyboard instruction display device, and its associated musical notation showing diagrams which contain necessary and sufficent information about key location, tone length, and the order of the key activation that is used during piano playing. These diagrams follow the forms included in the associated musical notation, and are correlated to the piano keyboard via a scale bars ruler placed behind the piano keys.

It obviates the use of accidentals, and clearly separates the spatial aspect of locating keys on the keyboard from the temporal aspect of the rhythmic activation of these keys.

Furthermore the diagrams, called here pianopics (for piano pictures) appear on the display and on the printed page side by side, maintaining the natural order "left picture for the left hand and right picture for the right hand".

In addition, the same few rules of operation and key assignment apply to the left and right hand pianopics in contrast to the "F" and "G" clefs in the standard notation where for example a "E" note would appear on different lines.

It represents left hand and right hand play in the same way, side by side, and maintains a visual alignment of keys in its vertical arrangement.

It uses a handful of easily remembered intuitive rules to operate.

It provides the pupil with a visual mental picture of a sequence of notes which is useful for memorizing musical pieces.

It never gets congested on the printed page since the tempo indicator handles the speed variations in the play.

It is directly applicable to songs chord accompaniment including Christmas carols, multi-voice choral pieces, and popular music themes.

The advent of keyboard synthetizers now allows a composer to create full orchestrations by using the pianopics notation written side by side for the different instruments.

A definition for the new word "pianopic" referenced throughout this document is as follows: a graphical representation of a musical event involving none, one, or more notes, usually depicted as a scale bar diagram composed of black and white rectangular shapes placed side by side in an arrangement matching the twelve keys of an octave on a piano keyboard, from which hang none, one, or more black and/or white rectangles indicating the actual piano keys to strike. The pianopic may include above the scale bar a timing diagram composed of a numeral on top of each key representation matching the number of beats that key is held down, and a path starting with a dot, ending with an arrow, thus indicating the order in which the keys are struck. The scale bar may show on its left or its right side an octave symbol marker, usually one or more arrows, indicating a shift of one or more octaves respectively to the left or the right from the middle "C" octave located in the center of the piano.

BRIEF DESCRIPTION OF THE DRAWINGS

The first one involves the same note struck twice, the first time for a duration of three beats and the second time for the duration of two beats.

The second diagram involves three notes struck in succession for three, two, and three beats respectively.

FIG. 11 shows how a tied note is represented. When a key is to be struck in one pianopic and then released in a following one, it appears in both pianopics as (S)ustain and (R)elease notes. The note duration is the sum of the "sustain" beats plus the "release" beats, here four beats.

REFERENCE NUMERALS IN DRAWINGS

1 Scale Bar
2 Scale bar Arrowhead
3 Bouncing Ball
4 Path
5 Path end Arrowhead
6 White key representation
7 Black key representation
8 Tone lenght Indicator
9 Key toggle switch
10 Tone lengh Indicator temporary switch
11 Legato play timing circle shadow
12 Scale bar arrow toggle switch
13 Timing circle diagram
14 Electrical bulb for a scale bar
15 Electrical bulb for a right arrow
16 Electrical bulb for a timing circle
17 Electrical bulb for a left arrow in a side view
18 Electrical bulb for a black key shape
19 Electrical bulb for a white key shape
20 Electrical bulb for a left arrow
101 Top plate with predrawn pianopics shapes
1501 Top plate of manually operated device with predrawn pianopics shapes
1502 Electric bulbs
1503 Electrical switches
1504 Electrical power source
1601 Top plate of automatically operated device with predrawn pianopics shapes
1602 Electric bulbs of automatically operated device
1603 Control unit
1604 Memory unit
1606 Electrical power source
1701 Liquid cristal display
1702 Memory for display
1703 Control unit
1704 CD rom memory unit
1705 User input unit
1801 Computer display
1802 Video display memory
1803 CPU
1804 Memory unit of computer system
1805 Pianopics instruction software
1806 User input via computer keyboard
2001 Sample pianopics file format for plate and bulbs type display
2101 Sample pianopics file format for LCD or monitor type display

DETAILED DESCRIPTION OF THE PREFERRED EMBODIMENTS

Figure 1:
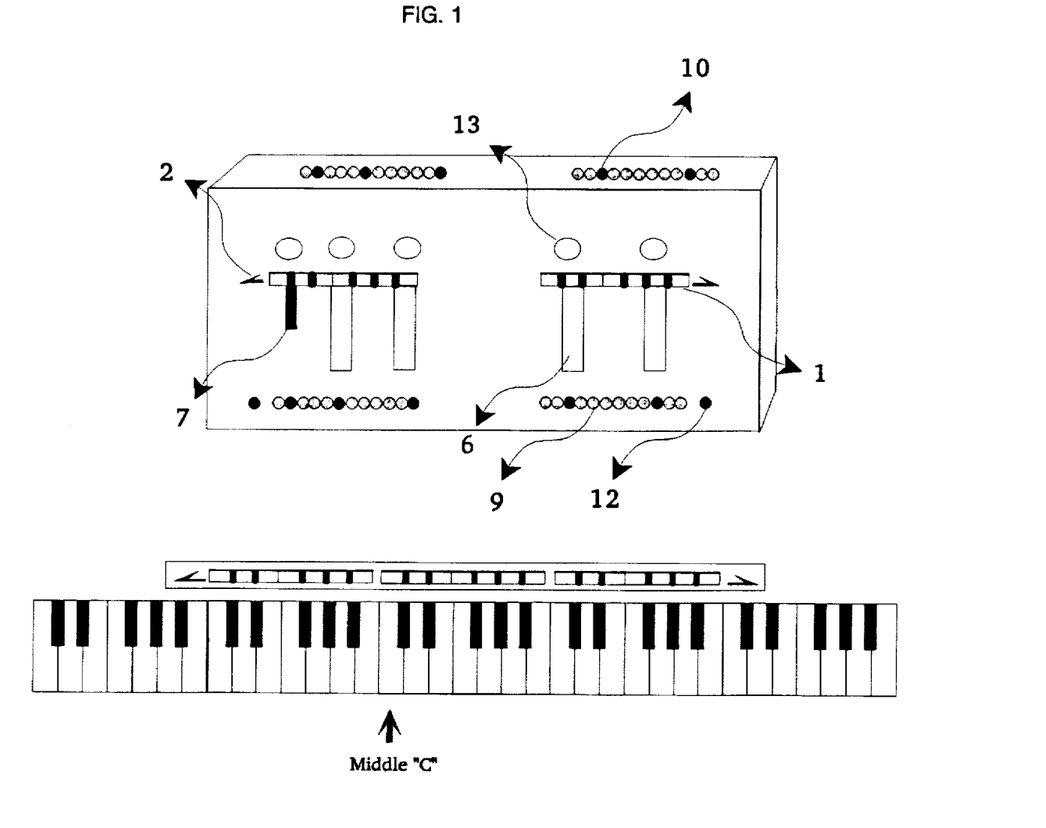
FIG. 1 shows the pianopics display illuminated for a 2 hand musical sequence using five keys, and a partial piano keyboard and the scale bars ruler slipped behind the piano keys helping correlate the piano keys to be struck with their representation on the pianopics display.
Figure 2:
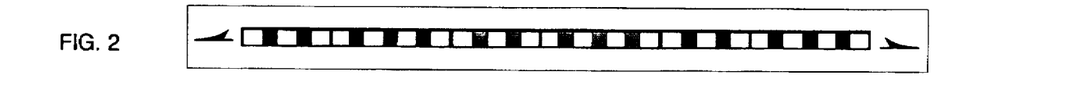
FIG. 2 shows the scale bars ruler.

The musical keyboard instruction display device illustrated in the drawings comprises a box holding five components: an electrical energy source, a set of toggle switches generally designated 9, a set of temporary switches designated 10, a front plate made of a rigid transparent material imprinted with predrawn shapes such as circles 13, arrows 2, rectangles 6 and 7, and finally a set of electrical bulbs each placed behind a plate shape and triggered by the activation of a switch 9 or 10 and its connected wiring thus illuminating that one plate shape. For each shape predrawn on the front plate there is one switch, one bulb, and one wire connecting it to the electrical energy source. The temporary switches 10 are used to light up the circles 13 positioned above the scale bar 1, each one switch 10 is located directly above a key shape. The toggle switches 9 are used to illuminate the white and black rectangles 6 and 7 respectively and are positioned below the keys, one for each key location in the scale bar 1. Extra toggle switches 12 are placed just below the arrows 2 and activate these. The scale bars ruler of FIG. 2 is to be placed behind the keys of a piano or musical keyboard and is meant to help relate the positions of the pianopics key shapes 6 and 7 to those of the actual piano keys by providing a common reference feature. The pianopics display in FIG. 1 is operated by the instructor in front of the pupil. The teacher depresses the toggle switches 9 first in order to light up the keys of the scale bar 1 and the arrows, thus giving the pupil the necessary information to locate on the piano keyboard which keys are to be struck. Then the teacher depresses the temporary switches on top of the display which correspond to the lighted key shapes 6 and 7 for the proper duration and in the proper order thus giving the pupil the necessary information about the rhythm for that sequence of notes. The pupil then replicates this event on the piano, using one's fingers as substitutes for the lighted circles.

Figure 15:
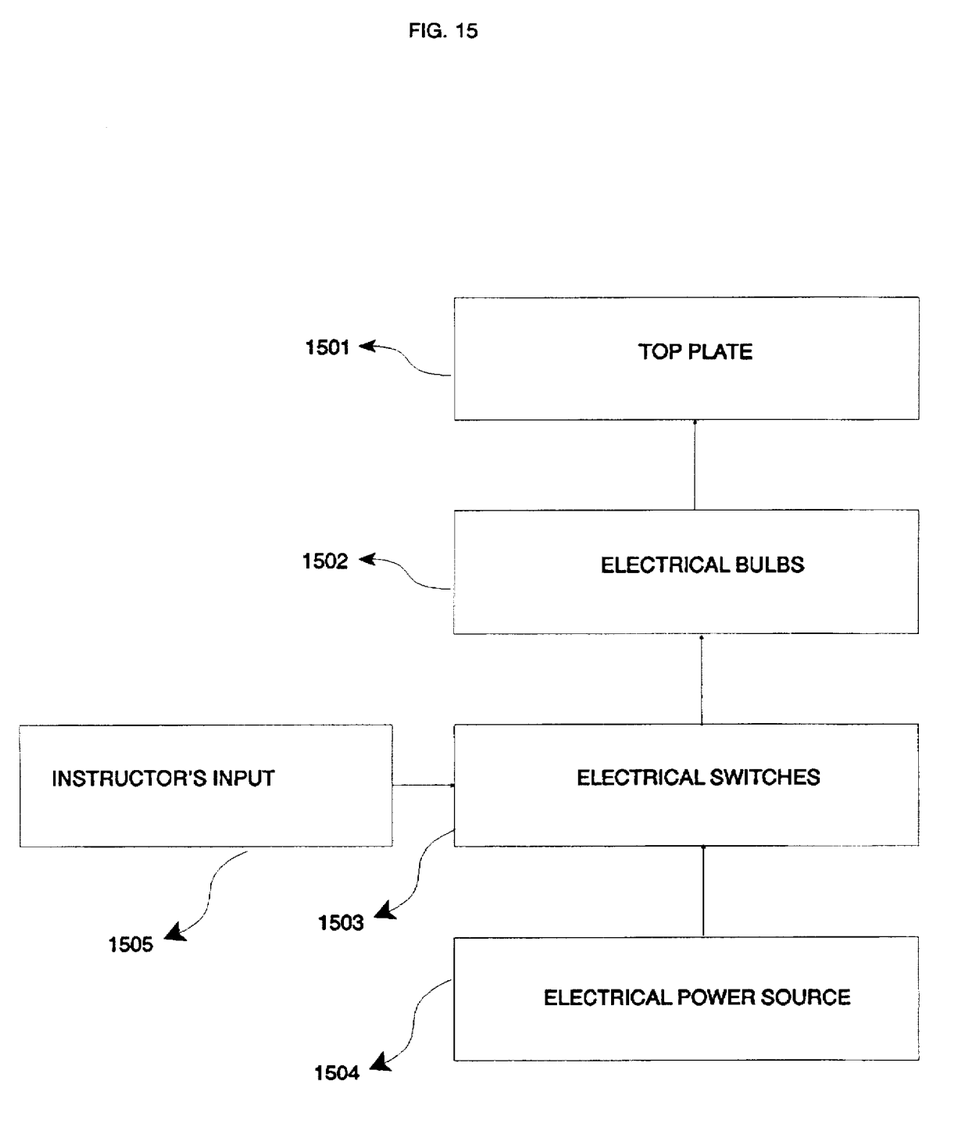
FIG. 15 is a block diagram of a manually operated pianopics display device according to the invention.

In a preferred embodiment of which FIG. 15 is a block diagram, the keyboard instruction display device is a manually operated electro-optical display device comprising a top plate 1501 with predrawn pianopic shapes electrical bulbs 1502, set of electrical switches 1503, and an electrical power source 1504, a system used just as described above, the block diagram of FIG. 15 showing the relationship of its elements.

Figure 16:
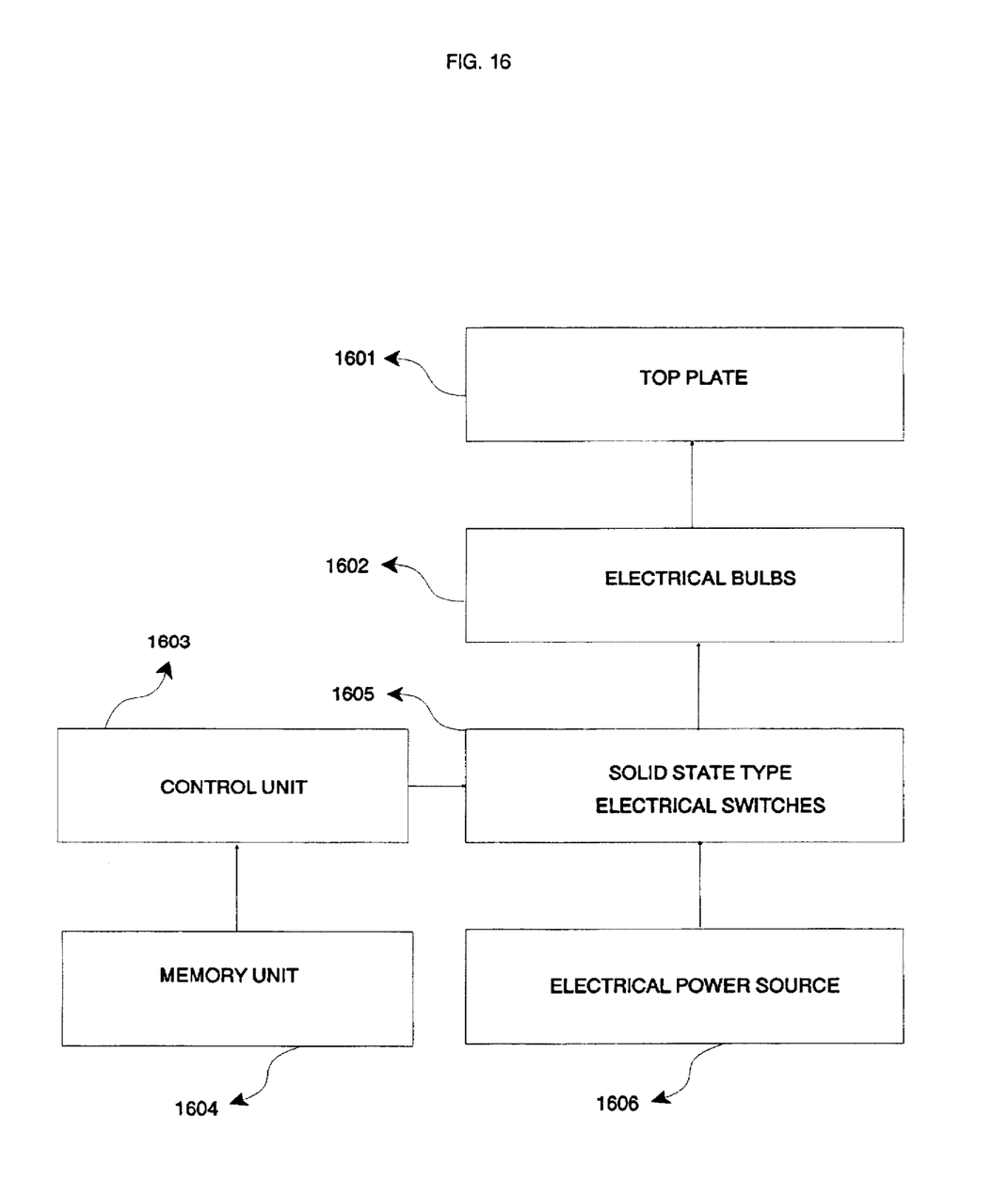
FIG. 16 is a block diagram of an automatically operated pianopics display device according to the invention.
Figure 20:
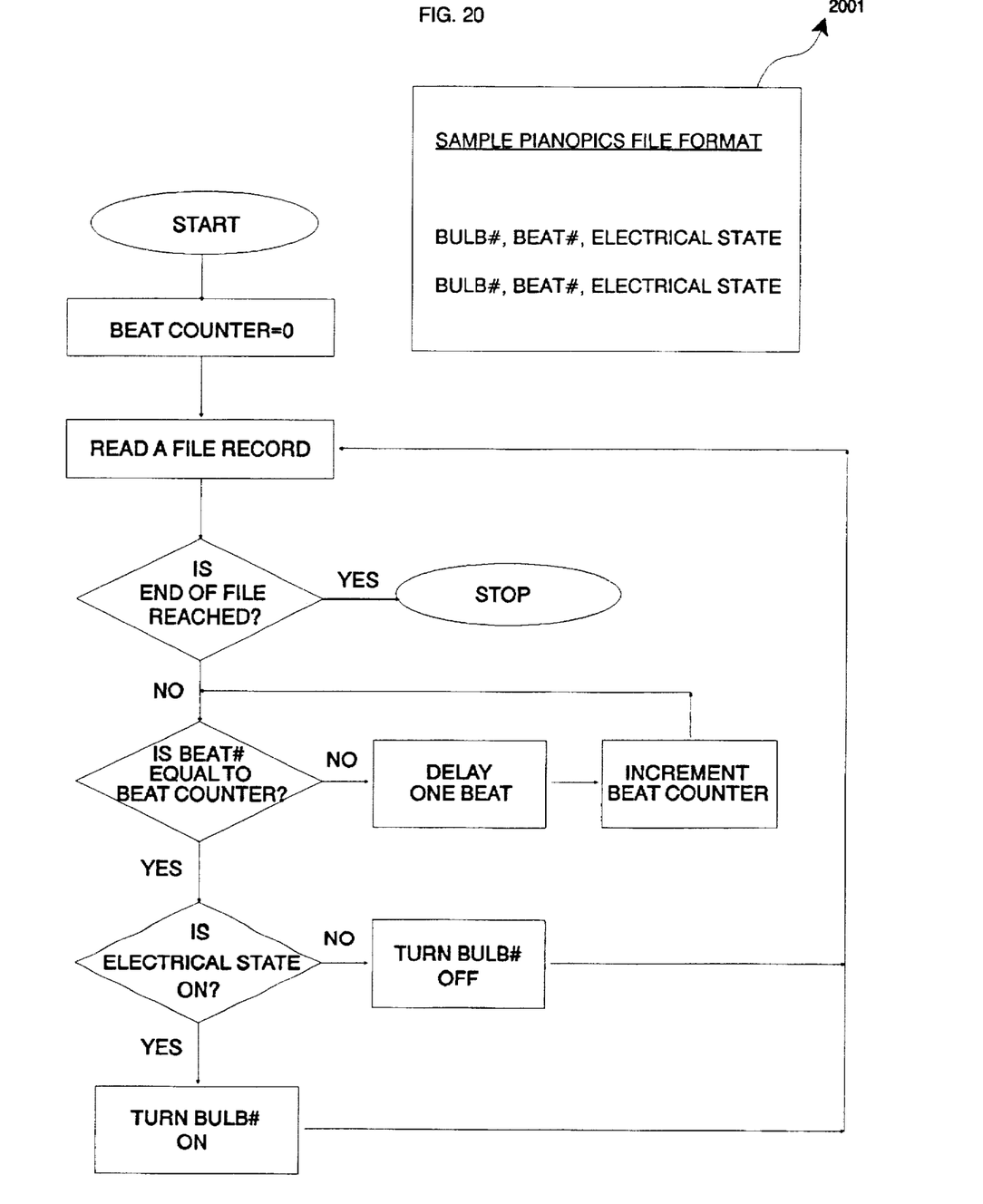
FIG. 20 is a flow chart diagram describing the processing of a pianopics file for the device associated with the block diagram of FIG. 16.

In a preferred embodiment of which FIG. 16 is a block diagram, the electrical switches 9 are of the solid state type and are triggered by the control unit 1603, in a predefined sequence following instructions residing in the memory unit 1604, thus automating the teacher's sequence of actions. The memory unit 1604 hods an encoded datafile following the sample pianopics file format 2001. Each data record includes a bulb# corresponding to a specific bulb behind a specific shape of the top plate 1601, a beat# indicating the specific moment in time the event involving the bulb will take place, and an electrical state of ON or OFF indicating the nature of the event: bulb ON or bulb OFF. The control unit 1603 is build with digital circuitry, follows the flowchart of FIG. 20 and processes a data file of type 2001 stored in the memory unit 1604, one record at a time until the end of file marker is reached.

Figure 17:
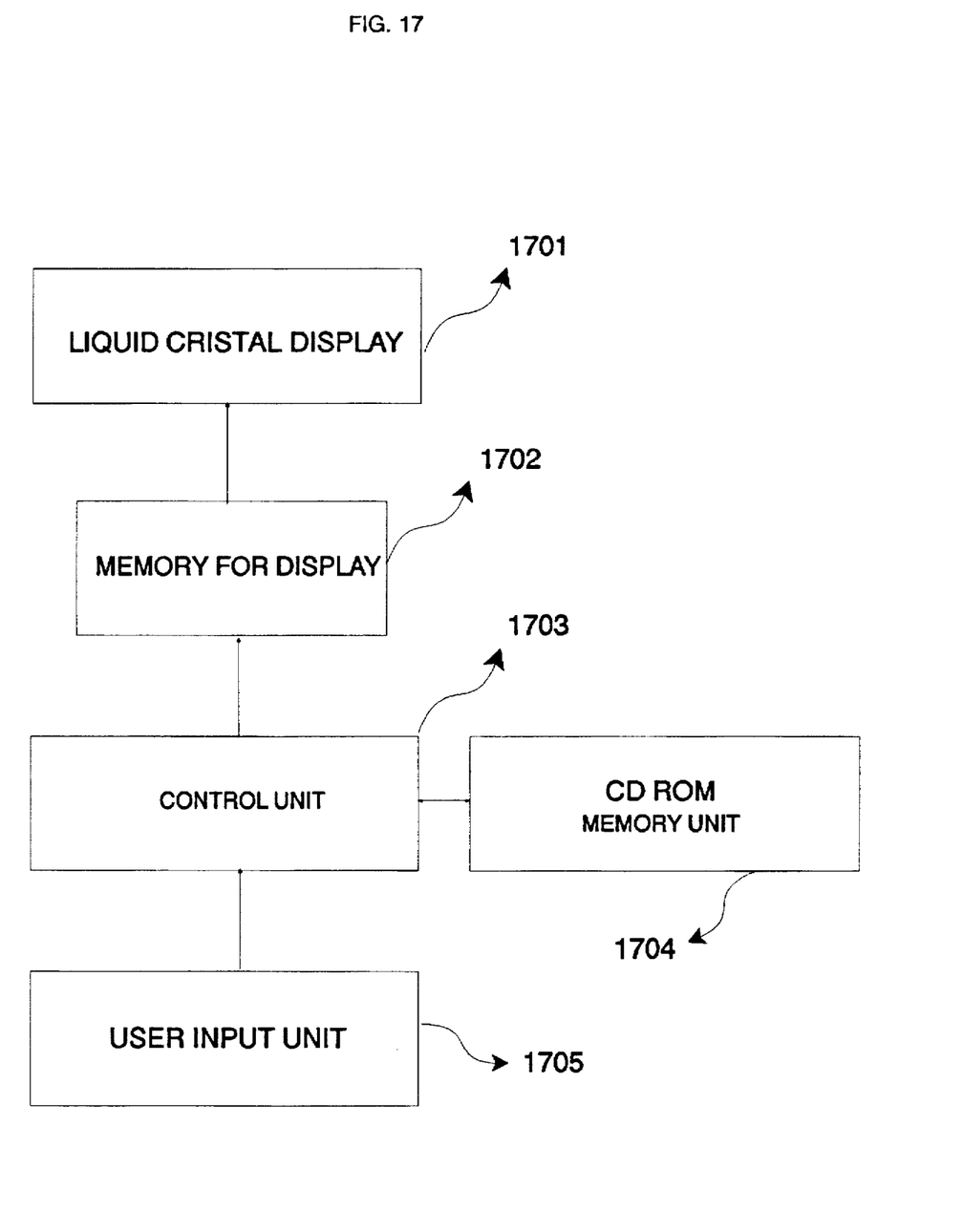
FIG. 17 is a block diagram of a user controlled pianopics display device using a compact disk memory storage medium, a display memory unit, a liquid crystal display type for showing the pianopics shapes, and a user input unit to start and stop the device.
Figure 21:
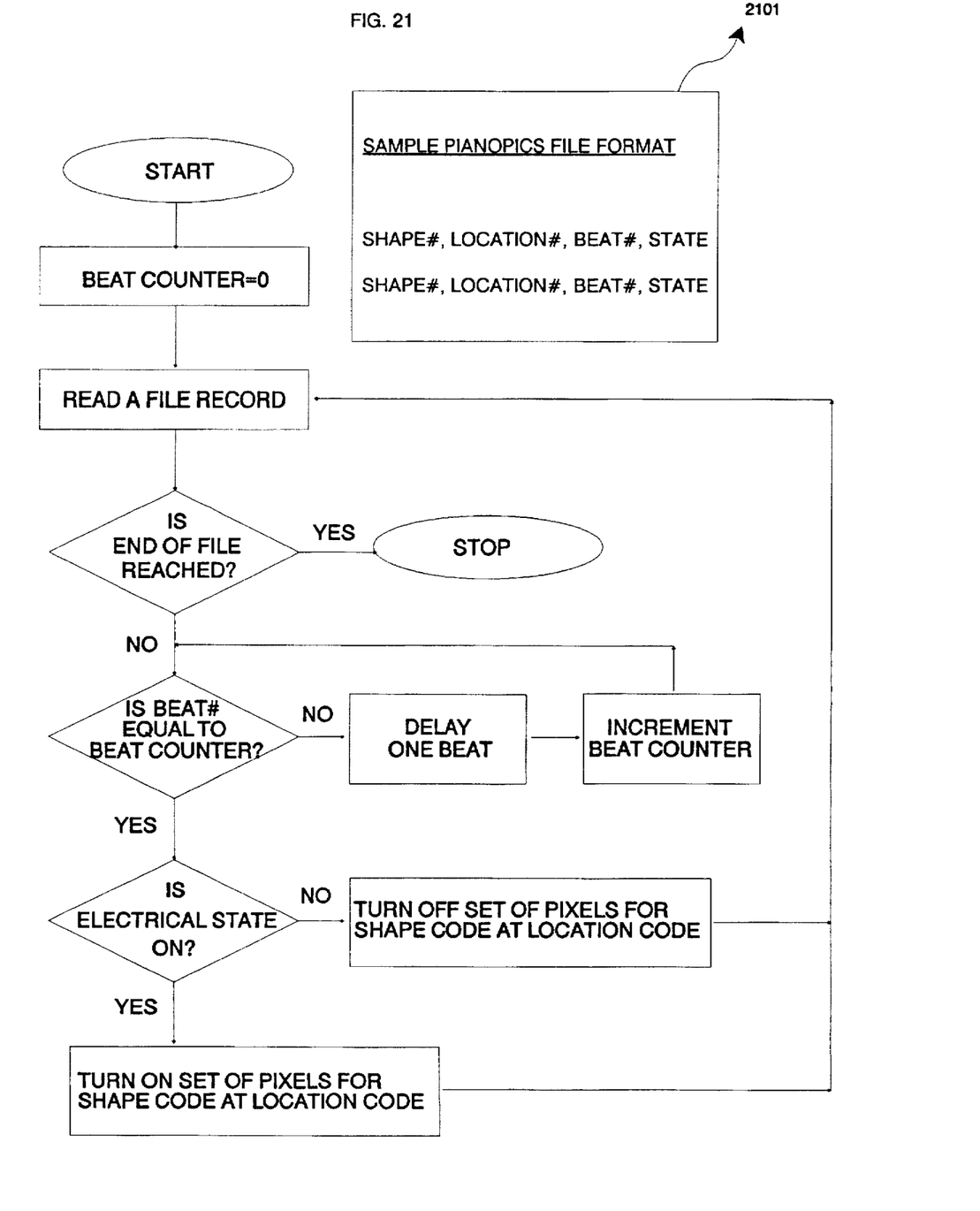
FIG. 21 is a flow chart diagram describing the processing of a pianopics file for the device associated with the block diagram of FIG. 17.
Figure 22:
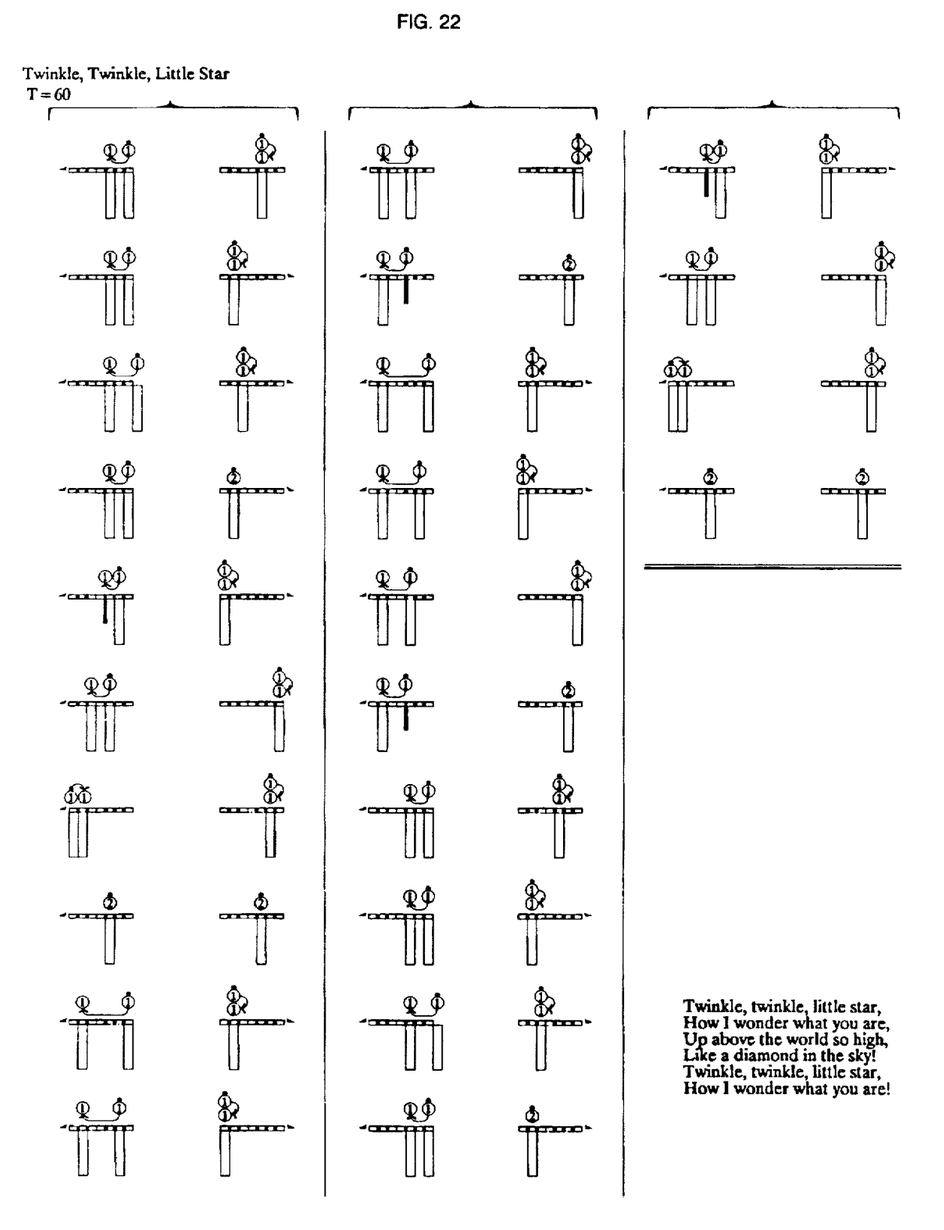
FIG. 22 illustrate sheet music written in the pianopics musical notation system.
Figure 23:
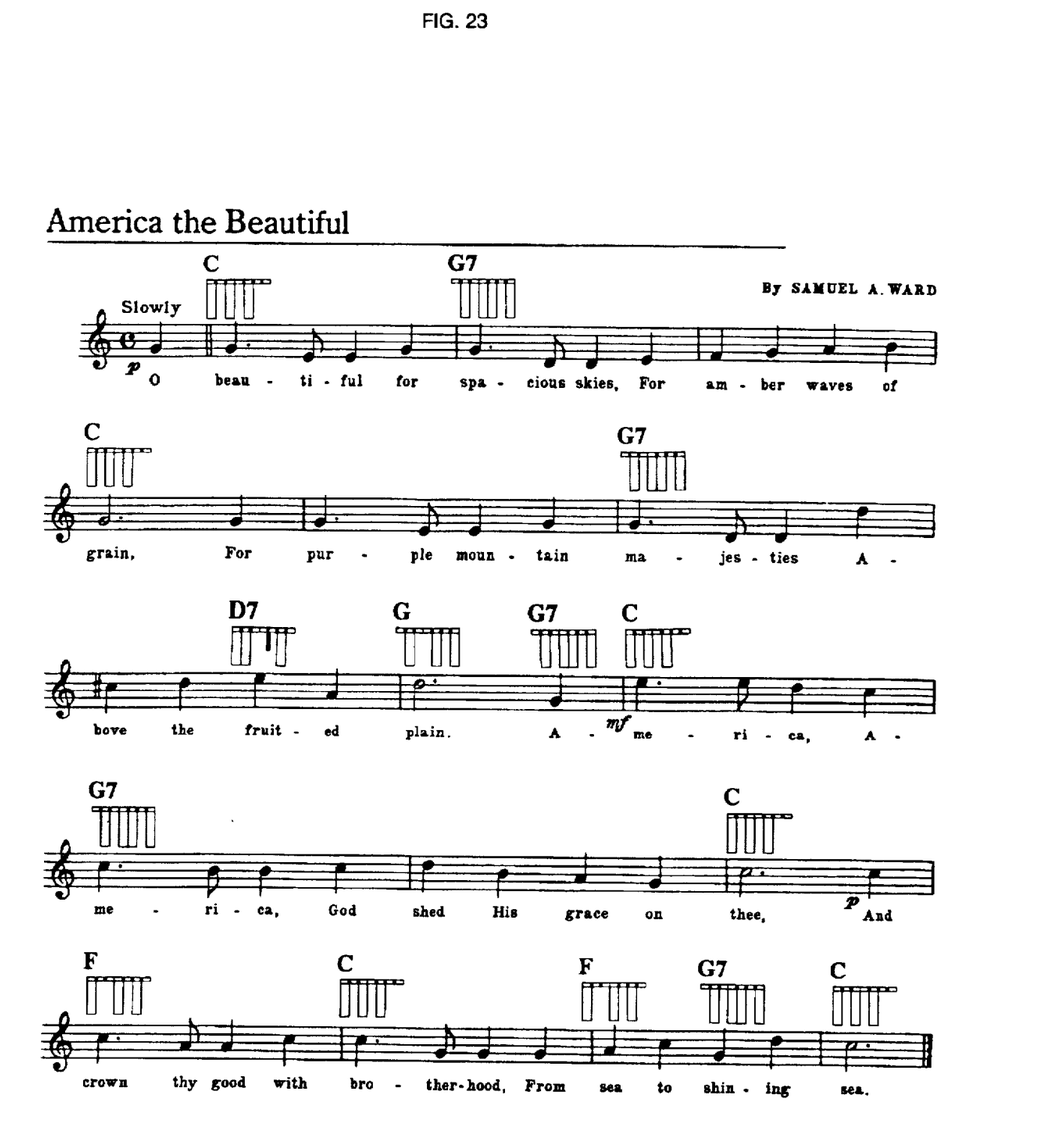
FIG. 23 illustrate standard sheet music with the addition of pianopic representations of chords.
Figure 24:
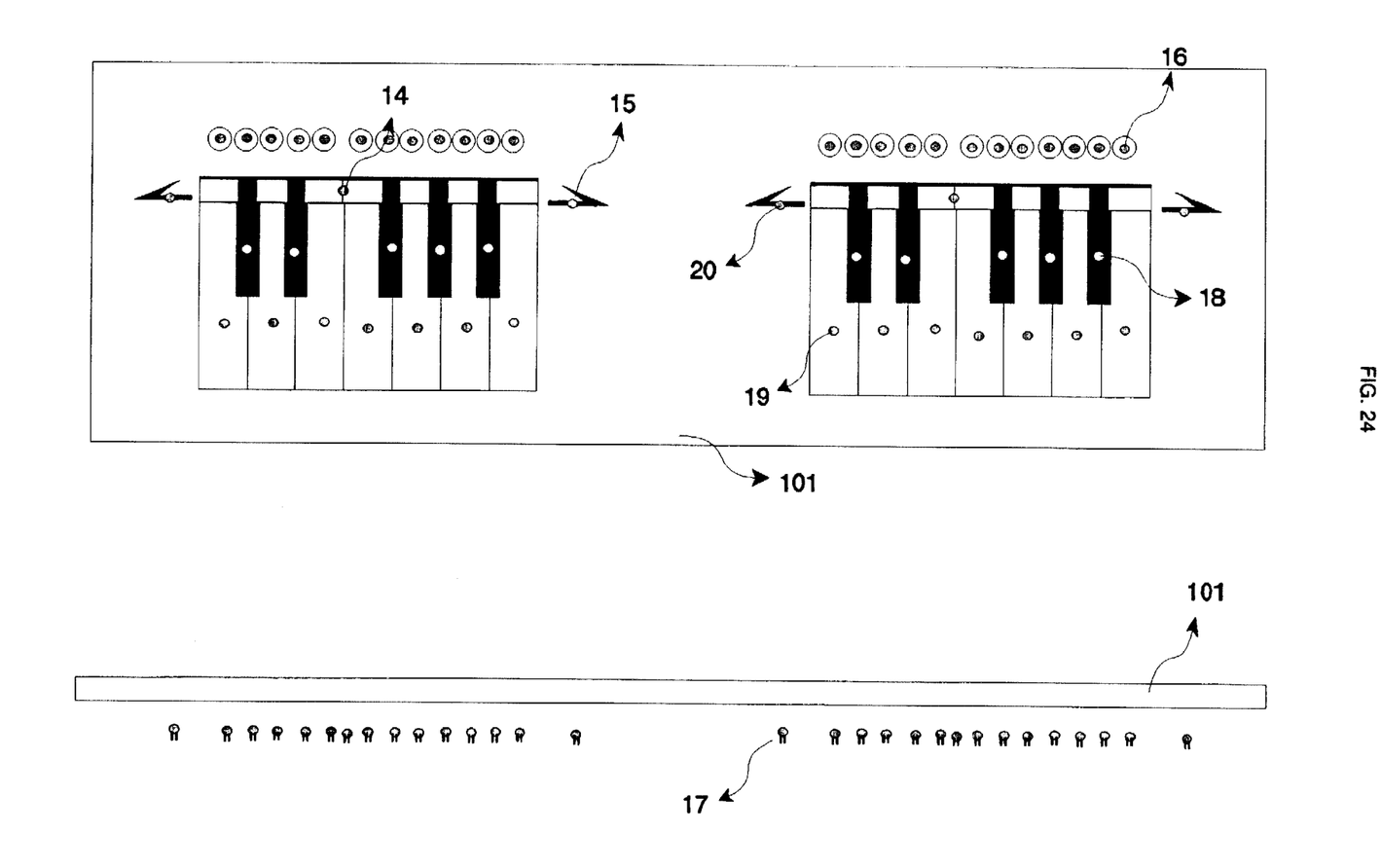
FIG. 24 shows a top view of the top plate and electrical bulbs, and a side view of the same.

In preferred embodiments of which FIG. 17 is a block diagram, the electro-optical device is a liquid cristal, electroluminescence, plasma, or holographic display device, while the memory unit is a digital storage device such as memory chip, memory card, floppy disk, or CD rom in any combination of display and memory types. The user input unit comprising a set of buttons used to load the memory for display holding the pianopics shapes data, load and start the sequence of instructions residing in the memory unit. FIG. 17 shows a block diagram for a device using a CD rom memory unit 1704 which comprises a number of tracks holding various pianopics data files. These are selected via a user input unit 1705 comprising a set of buttons, one for each track, along with a start button. The control unit 1707 processes one such data file in the format 2101 following the flowchart of FIG. 21 one record at a time until the end of file marker is reached. The liquid cristal display 1701 takes the place of the top plate 1601 and electrical bulbs 1602 of the previous embodiment. Instead of lighting up one bulb for one shape, the system lights up a set of pixels making up the same shape, the coding for which resides in the display memory 1702.

Figure 18:
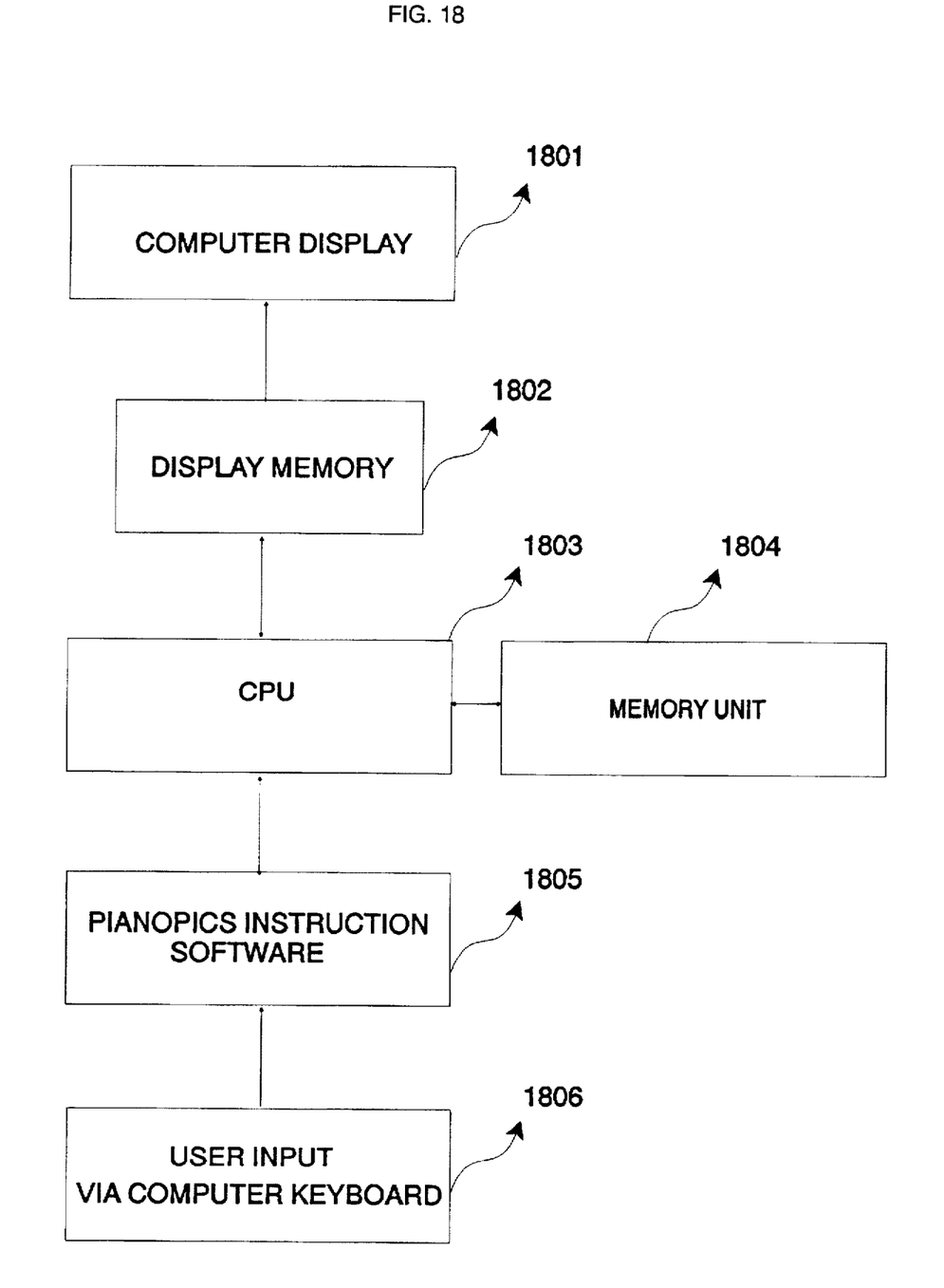
FIG. 18 is a block diagram of a computer system used as a pianopics display device, and running the pianopics method software.
Figure 19:
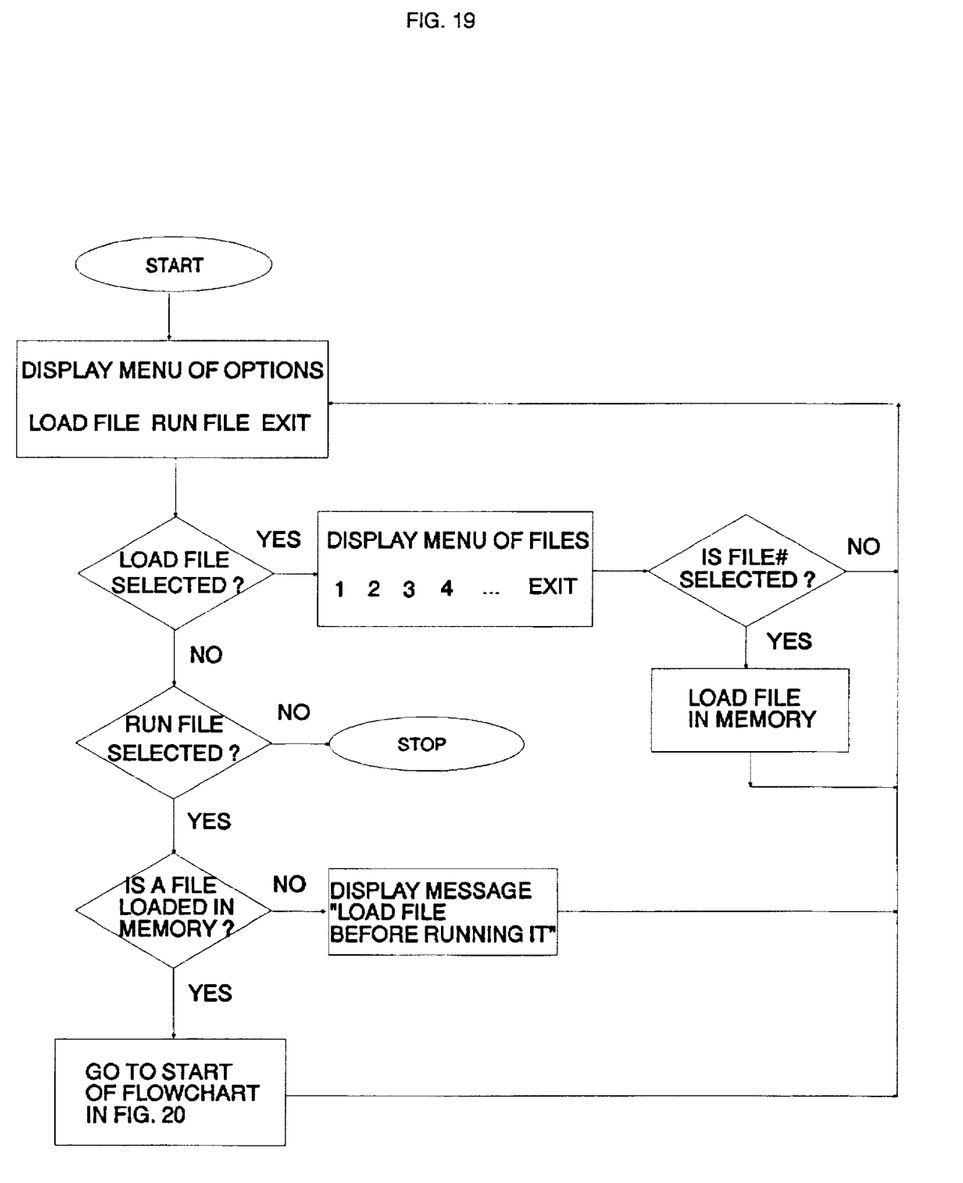
FIG. 19 is a flow chart diagram of the front end of the pianopics software operating on a computer system used as a pianopics musical keyboard instruction display device.

In a preferred embodiment of which FIG. 18 is a block diagram, the musical keyboard instruction device is a computer system running the pianopics instruction software program 1805. This software enables the user to select which pianopics data files of type 2101 stored in the memory unit 1805 to run, and to process it according to the flowchart of FIG. 21. The drawing of the pianopics diagrams on the computer system display 1801 is controlled by codes residing in the display memory 1802 which lights up a sets of pixels making up the pianopic shapes.ls is performed in a sequential manner so as to simulate the sequence of actions of the teacher using the first keyboard instruction device embodiment in FIG. 15.

Figure 3:
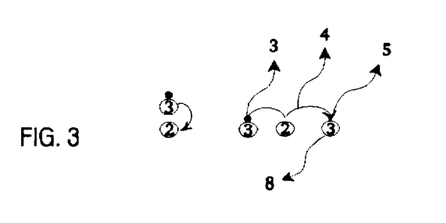
FIG. 3 shows a couple of timing diagrams.
Figure 4:
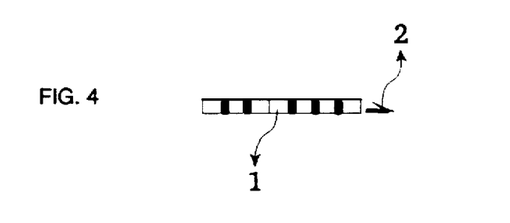
FIG. 4 shows a scale bar with one arrow pointing to the right, thus indicating that the playing hand should be shifted one octave to the right of middle "C".
Figure 5:
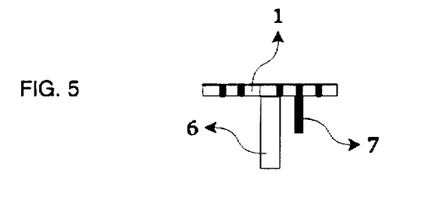
FIG. 5 shows how the keys are represented: a white rectangle for a white key and a smaller black rectangle for a black key hanging from and lined up with their counter parts on the scale bar.
Figure 6:
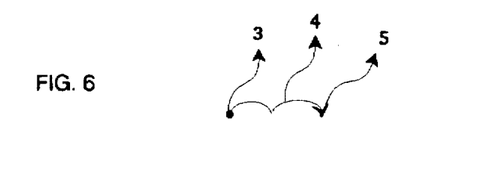
FIG. 6 shows the top portion of a timing diagram, the "bouncing ball" and its path ending with the arrowhead indicating the order in which the keys are to be struck.
Figure 7:
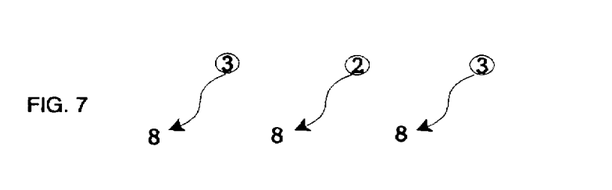
FIG. 7 shows three tone length indicators measured in number of beats.
Figure 8:
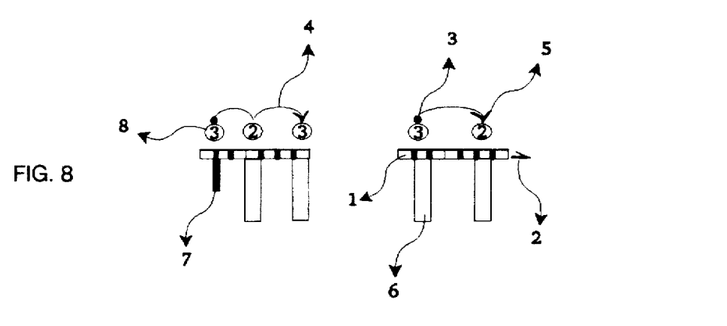
FIG. 8 shows a set of left hand and right hand pianopics as it appears on the printed page, set up in a vertical manner so as to maintain the vertical alignment of the keys.
Figure 9:
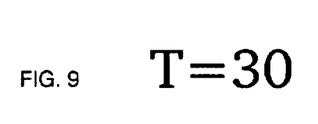
FIG. 9 shows a tempo indicatior of thirty beats per minute, each beat lasting two seconds. This is the setting for a metronome. It is used to change on the fly the duration of the beat unit thus allowing variations in the speed of play while maintaining simplicity in the notation.
Figure 10:
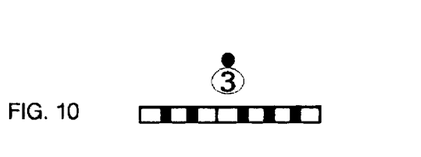
FIG. 10 shows a rest which is merely a timed symbol without a corresponding key.
Figure 11:
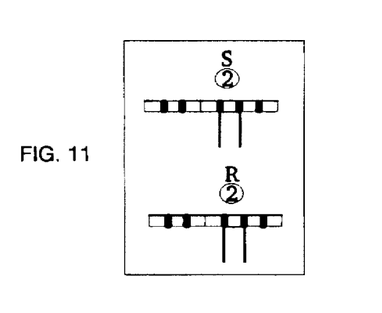
Figure 12:
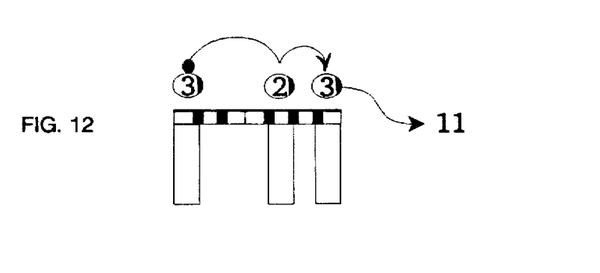
FIG. 12 shows how legato play is achieved as notes overlap, that is when the next note starts before the first one is ended. In other words each note involved lasts a little longer than the duration indicated. It is represented by a shadow in the timing circle.
Figure 13:
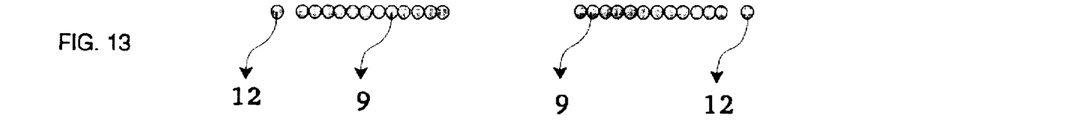
FIG. 13 shows the two banks of toggle switches used to light up the diagrams of the keys as well as the arrows on the display. There is one switch per key/arrow.
Figure 14:
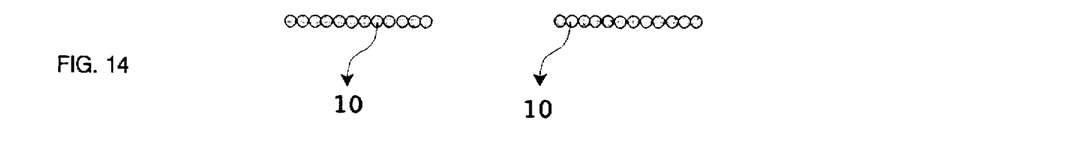
FIG. 14 shows the two banks of temporary switches used to light up the timing circles above each lighted key for the desired duration and in the proper order of play.

The pianopics musical notation in FIG. 8 resembles closely the pianopics musical keyboard instruction display device in FIG. 1 once it has been lit up. However since a timed event occurs when the display is operated as the circles light up rhytmically, the notation reflects this by using numerals 8 inside the circles of FIG. 7 to signify how long each corresponding key is to be held down. The tone length is measured in number of beats. FIG. 6 shows the path diagram representing the order in which the keys are to be pressed. The dot 3 can be thought of as a bouncing ball following the path that ends with the arrowhead. The first key to be pressed is the one which tone duration circle 8 lies below the dot 3. The next key is the one that lie on the path 4 of the bouncing ball and the last key is the one with the arrowhead 5 on top of its duration circle 8. FIG. 3 shows two such timing diagrams, the first one lasting five beats, the second one lasting seven beats. In FIG. 8 two PianoPics are positioned side by side. The one on the left side is to be played by the left hand and the one on the right side is to be played by the right hand. Both hands start playing simultaneously with the keys 6 and 7 topped by the dots 3. The remainder of the play is dictated by the two timing diagrams and their sequence of beats. In this particular case the right hand stops playing three beats before the left hand does. A music line as is FIG. 8 ends along with the last note played by either hand. The notation represents the succession of pianopics created by the teacher, in a top down vertical fashion. This arrangement maintains the relative alignment of the keys thus helping in the locating of keys when one goes from reading one line to reading the next one. The speed of play, that is the duration of a beat is governed by the tempo indicator of FIG. 9. In this case it is thirty beats per minute, each beat lasting two seconds. This by the way corresponds to the setting on a piano metronome. FIG. 10 shows a PianoPic without a key shape and is used to indicate a rest lasting three beats in this case. Musical slurs and legato play are achieved as notes overlap in their tone durations, that is when each note lasts a little longer than the preceeding one. It is indicated in FIG. 12 by a shadow 11 in the timing circle 8 of the notes involved. When a key is to be struck in one pianopic and then released in a following one, a tied note occurs. It is represented in FIG. 11 by a (S)ustain note in the top pianopic and the (R)elease note in the bottom pianopic. The total note duration is the sum of the beats for the (S)ustain and (R)elease notes, in this case it is four beats. (S)ustain notes, like the dotted ones, simultaneously start the play of a pianopic. It will thus be seen that pianopics are to this music notation what words are to the written language. They are made up of notes just like words are made up of letters.

Accordingly, the reader will see that the pianopics display can be used to learn to play a keyboard instrument easily and conveniently.

Although the description above contains many specificities, these should not be construed as limiting the scope of the invention but as merely providing illustrations of some of the presently preferred embodiments of this invention. For example, the display can include only one hand pianopics generator with or without scale shifting arrows, using permanently lit circled numerals instead of temporarily lit circles, or it might show two or more lines of two hand PianoPics designed to help in developing reading speed.

Also the shapes of all the components used to represent the keys or timing may be different such as ovals, trapezoidal, triangular, or a combination of elementary shapes. In addition, the display could also be the visual part of a computer software program showing on a computer monitor.

Thus the scope of the invention should be determined by the appended claims and their legal equivalents, rather than by the examples given.

What is claimed is:

1. A musical keyboard instruction device for a musical keyboard having a plurality of arrays of keys, each said array having five black keys and seven white keys in a specified order, said device comprising:

an elongate marking device in the form of a multi-scale ruler having opposed left and right ends and comprising three sets of five dark and seven light rectangular shapes matching in width and order the black and white keys respectively of the keyboard, octave symbol markers on the left and right ends respectively of the marking device, the marking device being configured for placement in proximity to the keys of the keyboard such that the dark and light shapes of the marking device align respectively with the black and white keys of the keyboard; and a display bearing a musical notation system comprising a plurality of discrete indicia each of the indicia comprising one horizontal scale bar having five dark rectangular shapes and seven light rectangular shapes disposed in the order of the rectangular shapes on the marking device, elongate vertically aligned dark and light key shapes extending down from selected ones of the rectangular shapes of the scale bar in each of the indicia, said elongate key shapes in each of said indicia representing keys of the musical keyboard to be played as marked by the marking device, said indicia further comprising duration symbols aligned with said elongate key shapes and indicating a beat duration for each key identified by said respective elongate key shapes, and order identifying indicia for indicating any required order of playing keys identified in each of said indicia.

2. The musical keyboard instruction device of claim 1, wherein the indicia include an octave symbol marker in proximity to each of said indicia for identifying a selected octave on the keyboard.

3. The musical keyboard instruction device of claim 2, wherein:

the display shows side by side, two of said scale bars corresponding to left and right hands respectively; and;

the display further comprises an electrical system including illumination means disposed respectively in the key shapes and in the duration symbols for selective illumination, and a control unit connected to the respective illumination means for selectively illuminating the illumination means to indicate keys to be played and durations for playing keys.

4. The musical keyboard instruction device of claim 3 further comprising a memory unit device connected to the control unit for storing information to control sequences of the illumination means to be illuminated.

5. The musical keyboard instruction device of claim 4 in which the illumination means comprise at least one liquid crystal display and wherein the memory unit device is a CD rom device.

6. The musical keyboard instruction device of claim 3 in which the illumination means comprise a computer monitor and wherein the control unit and memory unit device comprise a computer system running a musical keyboard instruction software which allows a user to select and load a data file from a removable memory device.

7. A method of teaching piano music comprising the steps of sequentially presenting a student with sets of indicia, the set of indicia presented in each said step being different from the set of indicia in a preceding step, the steps corresponding to particular musical sequences of notes, said indicia presented in each said step comprising a horizontally aligned scale bar having a pattern of light and dark shapes corresponding respectively to white and black keys of a piano, each said set of said indicia further comprising two distinct and separate parts in proximity to said scale bar, one of said parts comprising at least one elongate key shape depending from at least one of said light and dark shapes of said scale bar for indicating precise piano keys to be struck, the other of said parts including numbers and arrows for indicating an order and duration of notes to be struck, said two distinct and separate parts differing from one said step to another.

8. A method as described in claim 7, wherein each said set of indicia is presented sequentially on an electro-optical display device.

9. A method as in claim 7, comprising as a first step positioning a multi-scale ruler in proximity to keys of a piano, said ruler having sets of light and dark shapes aligned respectively with white and black keys of the piano and corresponding to the light and dark shapes in each said set of indicia.

* * * * *